US012574817B2

(12) United States Patent
Ali et al.

(10) Patent No.: US 12,574,817 B2
(45) Date of Patent: Mar. 10, 2026

(54) MOBILITY MANAGEMENT OF USER EQUIPMENT BETWEEN NETWORKS BASED ON REGIONS OF CONGESTION

(71) Applicant: Cisco Technology, Inc., San Jose, CA (US)

(72) Inventors: Irfan Ali, Palo Alto, CA (US); Vimal Srivastava, Bangalore (IN); Ravi Shekhar, Maharastra (IN)

(73) Assignee: Cisco Technology, Inc., San Jose, CA (US)

( * ) Notice: Subject to any disclaimer, the term of this patent is extended or adjusted under 35 U.S.C. 154(b) by 433 days.

(21) Appl. No.: 18/347,783

(22) Filed: Jul. 6, 2023

(65) Prior Publication Data

US 2025/0016646 A1     Jan. 9, 2025

(51) Int. Cl.
*H04W 36/22*          (2009.01)
*H04W 36/00*          (2009.01)

(52) U.S. Cl.
CPC ....... *H04W 36/22* (2013.01); *H04W 36/0033* (2013.01)

(58) Field of Classification Search
CPC ........................... H04W 36/22; H04W 36/0033
See application file for complete search history.

(56) References Cited

U.S. PATENT DOCUMENTS

| | | | |
|---|---|---|---|
| 11,102,696 B1 | 8/2021 | Chockalingam | |
| 2020/0404107 A1 | 12/2020 | Cheng et al. | |
| 2021/0029597 A1 | 1/2021 | Xu et al. | |
| 2022/0030497 A1 | 1/2022 | Bhatti et al. | |
| 2022/0201543 A1* | 6/2022 | Zhu .................. | H04W 28/0925 |
| 2022/0417101 A1 | 12/2022 | Ding et al. | |
| 2023/0080830 A1* | 3/2023 | Fernandez Alonso ....................... | |
| | | | H04L 12/1407 |
| | | | 455/422.1 |
| 2023/0164649 A1* | 5/2023 | Park ................. | H04W 36/0055 |
| | | | 455/436 |
| 2023/0319687 A1* | 10/2023 | Kim ..................... | H04W 48/08 |
| | | | 370/329 |

FOREIGN PATENT DOCUMENTS

WO          2022170588          8/2022

* cited by examiner

*Primary Examiner* — Nizar N Sivji
(74) *Attorney, Agent, or Firm* — Polsinelli P.C.

(57)          ABSTRACT

The present technology involves system, methods, and computer-readable media for establishing mobility of user equipment (UEs) or mobile from congested new radio (NR) cells to un-congested Long-Term Evolution (LTE) cells. For operators that deploy both LTE cells and NR cells, the UEs can move from congested NR cells to un-congested LTE cells but can also be handed back into un-congested NR cells.

20 Claims, 10 Drawing Sheets

300

400

MOBILITY MANAGEMENT OF USER EQUIPMENT BETWEEN NETWORKS BASED ON REGIONS OF CONGESTION

DESCRIPTION OF THE RELATED TECHNOLOGY

Fifth-generation (5G) mobile and wireless networks provide enhanced mobile broadband communications and are intended to deliver a wider range of services and applications as compared to all prior-generation mobile and wireless networks. Compared to prior generations of mobile and wireless networks, the 5G architecture is service-based, meaning that wherever suitable, architecture elements are defined as network functions that offer their services to other network functions via common framework interfaces. To support this wide range of services and network functions across an ever-growing base of user equipment (UE), 5G networks incorporate the network slicing concept utilized in previous-generation architectures.

Within the scope of the 5G mobile and wireless network architecture, a network slice comprises a set of defined features and functionalities that together form a complete Public Land Mobile Network (PLMN) for providing services to UEs. This network slicing permits the controlled composition of a PLMN with the specific network functions and provided services that are required for a specific usage scenario. In other words, network slicing enables a 5G network operator to deploy multiple, independent PLMNs where each is customized by instantiating only those features, capabilities, and services required to satisfy a given subset of the UEs or a related business customer needs.

In particular, network slicing plays a critical role in 5G networks because of the multitude of use cases and new services 5G is capable of supporting. Network service provisioning through network slices is typically initiated when an enterprise requests network slices when registering with an Access and Mobility Management Function (AMF)/ Mobility Management Entity (MME) for a 5G network. At the time of registration, the enterprise will typically ask the AMF/MME for characteristics of network slices, such as slice bandwidth, slice latency, processing power, and slice resiliency associated with the network slices. These network slice characteristics can be used in ensuring that assigned network slices are capable of actually provisioning specific services, e.g., based on the requirements of the services, to the enterprise.

BRIEF DESCRIPTION OF THE DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
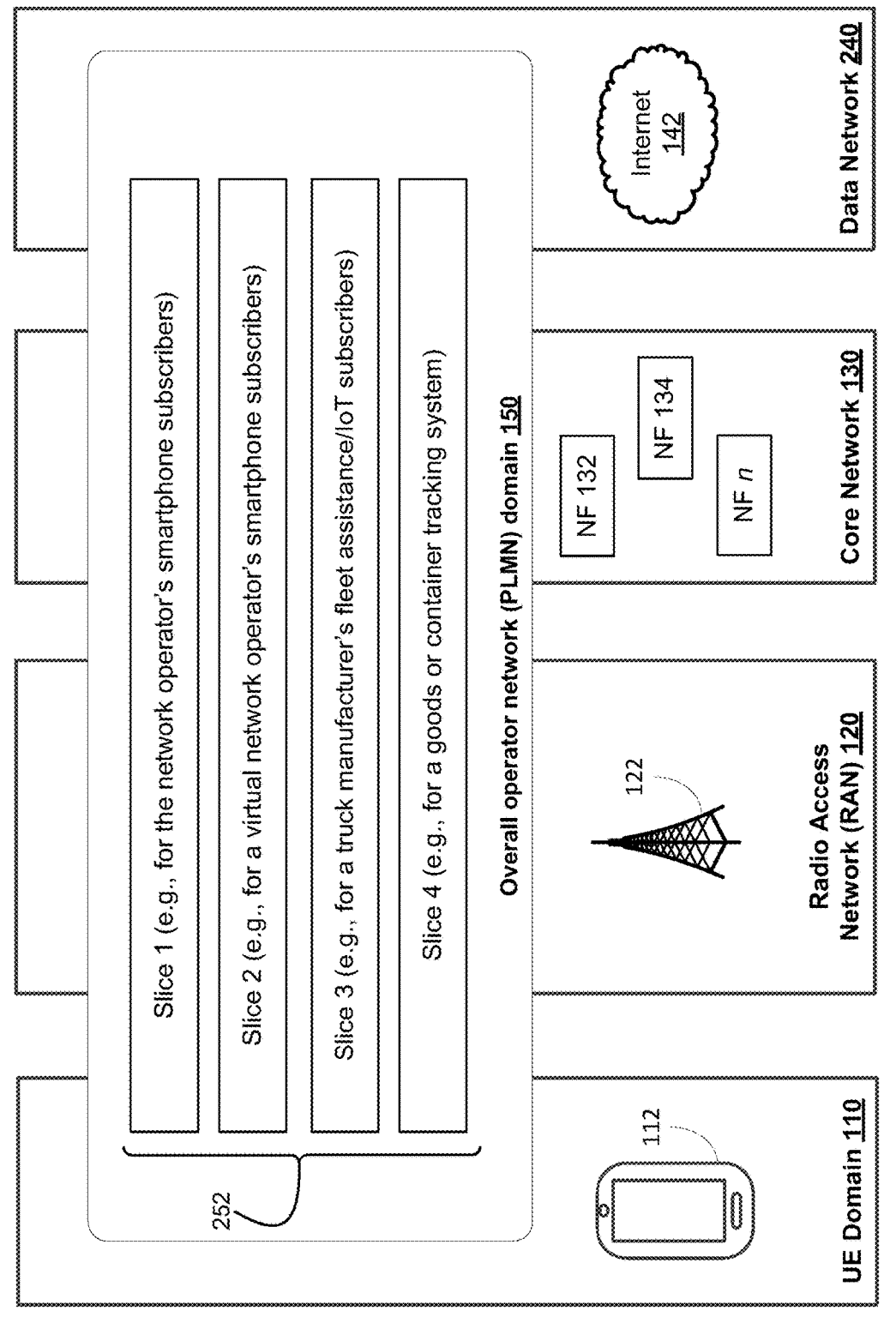
FIG. 1 depicts an exemplary schematic representation of a 5G network environment in which network slicing has been implemented, and in which one or more aspects of the present disclosure may operate according to some embodiments of the present technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

Disclosed are systems, apparatuses, methods, and non-transitory computer-readable medium for mobility management of UEs between 5G network and fourth generation (4G) network or Long-Term Evolution (LTE) network based on regions of congestion.

In one aspect, a method is provided for one or more user equipment (UE) moving between a first network comprising a plurality of gNodeBs (gNBs) and a second network comprising a plurality of evolved NodeBs (eNBs). The method may include receiving, by an Access and Mobility Management Function (AMF), from a Policy Control Function (PCF), an access management (AM) policy comprising a first radio frequency selection priority (RFSP) index. The method may also include communicating, by the AMF, to a first gNB regarding the AM policy. The method may also include receiving, by the AMF, an AM policy modification request comprising a second modified RFSP index from the PCF, based upon the PCF receiving a congestion notification indicating that the first gNB is congested until a predetermined time and identifying one or more UEs to be moved to one of the plurality of eNBs. The method may also include sending, by the AMF, a UE context update comprising the second modified RFSP index to the first gNB so that the first gNB decides whether to perform handover to the one of the plurality of eNBs for the one or more UEs. The method may further include sending, by the AMF, a forward relocation request comprising information about one or more of the one or more UEs, the second modified RFSP index, the first gNB, and/or the predetermined time to Mobility Management Entity (MME), so that the one of the plurality of eNBs decides whether to handover one of the one or more UEs to a second gNB before the predetermined time.

In another aspect, a non-transitory computer-readable medium may include instructions, the instructions, when executed by a computing system, cause the computing system to receive, by an Access and Mobility Management Function (AMF), from a Policy Control Function (PCF), an access management (AM) policy comprising a first radio frequency selection priority (RFSP) index. The instructions, when executed by a computing system, cause the computing system to communicate, by the AMF, to a first gNB regarding the AM policy. The instructions, when executed by a computing system, cause the computing system to receive, by the AMF, an AM policy modification request comprising a second modified RFSP index from the PCF, based upon the PCF receiving a congestion notification indicating that the first gNB is congested until a predetermined time and identifying one or more UEs to be moved to one of the plurality of eNBs. The instructions, when executed by a computing system, cause the computing system to send, by the AMF, a UE context update comprising the second modified RFSP index to the first gNB so that the first gNB decides whether to perform handover to the one of the plurality of eNBs for the one or more UEs. The instructions, when executed by a computing system, cause the computing system to send, by the AMF, a forward relocation request comprising information about one or more of the one or more UEs, the second modified RFSP index, the first gNB, and/or the predetermined time to Mobility Management Entity (MME), so that the one of the plurality of eNBs decides whether to handover one of the one or more UEs to a second gNB before the predetermined time.

In a further aspect, a network system may include an Access and Mobility Management Function (AMF), a policy control function (PCF), a Mobility Management Entity (MME), and an interface between the AMF and the MME. The network system may also include one or more processors coupled to the AMF, PCF, MME, and interface. The one or more processors may be configured to: receive, by the AMF, from the PCF, an access management (AM) policy comprising a first radio frequency selection priority (RFSP) index; communicate, by the AMF, to a first gNB regarding the AM policy; receive, by the AMF, an AM policy modification request comprising a second modified RFSP index from the PCF, based upon the PCF receiving a congestion notification indicating that the first gNB is congested until a predetermined time and identifying one or more UEs to be moved to one of the plurality of eNBs; send, by the AMF, a UE context update comprising the second modified RFSP index to the first gNB so that the first gNB decides whether to perform handover to the one of the plurality of eNBs for the one or more UEs; and send, by the AMF, a forward relocation request comprising information about one or more of the one or more UEs, the second modified RFSP index, the first gNB, and/or the predetermined time to the MME, so that the one of the plurality of eNBs decides whether to handover one of the one or more UEs to a second gNB before the predetermined time.

Example Embodiments

Mobile operators may run a merged network of 5G and 4G or LTE. To promote 5G service, the subscription data of user equipment (UE) may be set to 5G access first, when the UE has a subscribed RFSP (Radio Frequency Selection Priority) Index of the value of "5G having higher priority than 4G". The RFSP index allows a mobile operator to give the UE specific instructions as to how the different access networks are to be used. In some scenarios, Policy Control Function (PCF) may adjust the RFSP index to direct the UE from 5G to 4G or LTE according to dynamic network situations. For example, when PCF receives a prediction of network congestion from 5G network data analytics function (NWDAF), the PCF may move some of the "5G prioritized" UEs consuming low value applications to 4G access. According to the request from application function (AF), the PCF may move the requested UE(s) from 5G network to 4G network.

When the UE registers to Evolved Packet Core (EPC) that powers 4G or LTE network, MME chooses the RFSP Index in use based on the subscribed RFSP Index, the locally configured operator's policies, and the UE related context information available at the MME. If the EPC decides that the UE goes back to 5G, the MME provides "5G prioritized" RFSP Index to eNB. The UE may be sent back and forth to play ping-pong between 4G or LTE network and 5G network.

The present technology addresses the need in the art for removing the ping-pong between 4G and 5G under network congestion. The present technology involves system, methods, and computer-readable media for establishing mobility of UEs or mobile from congested new radio (NR) cells in the 5G network to un-congested LTE cells in the LTE network. For operators that deploy both LTE cells (e.g., eNBs) and NR cells (e.g., gNBs), the UEs can move from congested NR cells to un-congested LTE cells and can also be handed back into un-congested NR cells. Without the present technology, the LTE cells may not handover the UEs into the un-congested NR cells.

A description of network environments and architectures for network data access and services, as illustrated in FIG. 1 is first disclosed herein. A discussion of systems, methods, and computer-readable medium for mobility management of UEs between 5G and 4G networks based on regions of congestion, as shown in FIGS. 2-6, will then follow. The discussion then concludes with a brief description of example devices, as illustrated in FIGS. 7 and 8. These variations shall be described herein as the various embodiments are set forth. The disclosure now turns to FIG. 1.

FIG. 1 depicts an exemplary schematic representation of a 5G network environment 100 in which network slicing has been implemented, and in which one or more aspects of the present disclosure may operate. As illustrated, network environment 100 is divided into four domains, each of which will be explained in greater depth below; a User Equipment (UE) domain 110, e.g. of one or more enterprises, in which a plurality of user cellphones or other connected devices 112 reside; a Radio Access Network (RAN) domain 120, in which a plurality of radio cells, base stations, towers, or other radio infrastructure 122 resides; a Core Network 130, in which a plurality of Network Functions (NFs) 132, 134, ..., n reside; and a Data Network 140, in which one or more data communication networks such as the Internet 142 reside. Additionally, the Data Network 140 can support SaaS providers configured to provide SaaSs to enterprises, e.g., to users in the UE domain 110.

Core Network 130 contains a plurality of Network Functions (NFs), shown here as NF 132, NF 134 . . . NF n. In some embodiments, the core network 130 is a 5G core network (5GC) in accordance with one or more accepted 5GC architectures or designs. In some embodiments, the core network 130 is an Evolved Packet Core (EPC) network, which combines aspects of the 5GC with existing 4G networks. Regardless of the particular design of core network 130, the plurality of NFs typically execute in a control plane of the core network 130, providing a service-based architecture in which a given NF allows any other authorized NFs to access its services. For example, a Session Management Function (SMF) controls session establishment, modification, release, etc., and in the course of doing so, provides other NFs with access to these constituent SMF services.

In some embodiments, the plurality of NFs of the core network 130 can include one or more Access and Mobility Management Functions (AMF; typically used when core network 130 is a 5GC network) and Mobility Management Entities (MME; typically used when core network 130 is an EPC network), collectively referred to herein as an AMF/MME for purposes of simplicity and clarity. In some embodiments, an AMF/MME can be common to or otherwise shared by multiple slices of the plurality of network slices 152, and in some embodiments, an AMF/MME can be unique to a single one of the plurality of network slices 152.

The same is true of the remaining NFs of the core network 130, which can be shared amongst one or more network slices or provided as a unique instance specific to a single one of the plurality of network slices 152. In addition to NFs comprising an AMF/MME as discussed above, the plurality of NFs of the core network 130 can additionally include one or more of the following: User Plane Functions (UPFs); Policy Control Functions (PCFs); Authentication Server Functions (AUSFs); Unified Data Management functions (UDMs); Application Functions (AFs); Network Exposure Functions (NEFs); NF Repository Functions (NRFs); and Network Slice Selection Functions (NSSFs). Various other NFs can be provided without departing from the scope of the present disclosure, as would be appreciated by one of ordinary skill in the art.

Across these four domains of the 5G network environment 100, an overall operator network domain 150 is defined. The operator network domain 150 is in some embodiments a Public Land Mobile Network (PLMN) and can be thought of as the carrier or business entity that provides cellular service to the end users in UE domain 110. Within the operator network domain 150, a plurality of network slices 152 are created, defined, or otherwise provisioned to deliver a desired set of defined features and functionalities, e.g. SaaSs, for a certain use case or corresponding to other requirements or specifications. Note that network slicing for the plurality of network slices 152 is implemented in an end-to-end fashion, spanning multiple disparate technical and administrative domains, including management and orchestration planes (not shown). In other words, network slicing is performed from at least the enterprise or subscriber edge at UE domain 110, through the Radio Access Network (RAN) 120, through the 5G access edge and the 5G core network 130, and to the data network 140. Moreover, note that this network slicing may span multiple different 5G providers.

For example, as shown here, the plurality of network slices 152 include Slice 1, which corresponds to smartphone subscribers of the 5G provider who also operates the network domain, and Slice 1, which corresponds to smartphone subscribers of a virtual 5G provider leasing capacity from the actual operator of network domain 150. Also shown is Slice 3, which can be provided for a fleet of connected vehicles, and Slice 4, which can be provided for an IoT goods or container tracking system across a factory network or supply chain. Note that these network slices 152 are provided for purposes of illustration, and in accordance with the present disclosure, and the operator network domain 150 can implement any number of network slices as needed and can implement these network slices for purposes, use cases, or subsets of users and user equipment in addition to those listed above. Specifically, the operator network domain 150 can implement any number of network slices for provisioning SaaSs from SaaS providers to one or more enterprises.

5G mobile and wireless networks will provide enhanced mobile broadband communications and are intended to deliver a wider range of services and applications as compared to all prior-generation mobile and wireless networks. Compared to prior generations of mobile and wireless networks, the 5G architecture is service-based, meaning that wherever suitable, architecture elements are defined as network functions that offer their services to other network functions via common framework interfaces. To support this wide range of services and network functions across an ever-growing base of user equipment (UE), 5G networks incorporate the network slicing concept utilized in previous-generation architectures.

Within the scope of the 5G mobile and wireless network architecture, a network slice comprises a set of defined features and functionalities that together form a complete Public Land Mobile Network (PLMN) for providing services to UEs. This network slicing permits the controlled composition of a PLMN with the specific network functions and provided services that are required for a specific usage scenario. In other words, network slicing enables a 5G network operator to deploy multiple, independent PLMNs where each is customized by instantiating only those features, capabilities, and services required to satisfy a given subset of the UEs or a related business customer needs.

In particular, network slicing plays a critical role in 5G networks because of the multitude of use cases and new services 5G is capable of supporting. Network service provisioning through network slices is typically initiated when an enterprise requests network slices when registering with AMF/MME for a 5G network. At the time of registration, the enterprise will typically ask the AMF/MME for characteristics of network slices, such as slice bandwidth, slice latency, processing power, and slice resiliency associated with the network slices. These network slice characteristics can be used in ensuring that assigned network slices are capable of actually provisioning specific services, e.g. based on the requirements of the services, to the enterprise.

Associating SaaSs and SaaS providers with network slices used to provide the SaaSs to enterprises can facilitate efficient management of SaaS provisioning to the enterprises. Specifically, it is desirable for an enterprise/subscriber to associate already procured SaaSs and SaaS providers with network slices being used to provision the SaaSs to the enterprise. However, associating SaaSs and SaaS providers with network slices is difficult to achieve without federation across enterprises, network service providers, e.g., 5G service providers, and SaaS providers.

Figure 2:
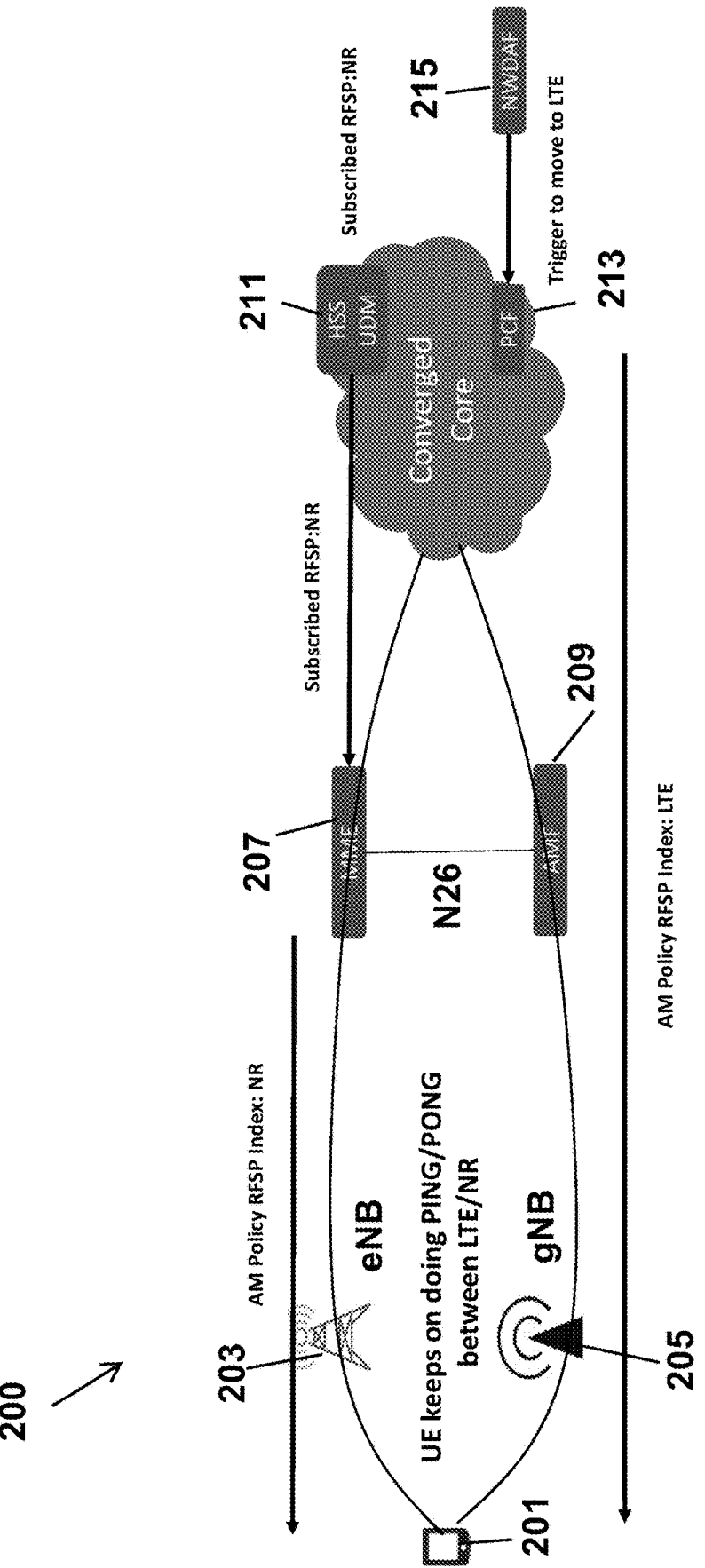
FIG. 2 is an example network diagram for mobility management of UEs between 5G and 4G networks based on regions of congestion according to some embodiments of the present technology.

FIG. 2 is an example network diagram for mobility management of UEs between 5G and 4G networks based on regions of congestion according to some embodiments of the present technology. The 4G network may also be referred to as LTE network or 4G LTE network. A network system 200 is provided for mobility management of UE 201 between gNB 205 and eNB 203. The network system 200 includes AMF 209 between gNB 205 and PCF 213 in the 5G network. The PCF 213 receives a notification of network congestion of 5G from NWDAF 215 to trigger the UE to move to eNB 203 from gNB 205. The network system 200 also includes MME 207 between eNB 203 and Home Subscriber Server (HSS) UDM 211 in the LTE network. The HSS UDM 211 provides subscribed RFSP index of NR cells or gNBs to MME 207. RFSP is also referred to as SPID (Subscriber Profile ID for RAT/Frequency Priority) in 3GPP specifications.

The PCF 213 communicates to AMF 209 about access management (AM) policy modification. Then, the AMF 209 provides the information about congested NR cells (e.g., a list of congested NR cells or gNBs 205) with a modified RFSP index and an RFSP expiry time to the MME 207. The MME 207 then provides the information about congested NR cells or gNBs 205 to the LTE cells or eNBs 203 serving the UE 201. Specifically, the MME 207 provides the information about congested NR cells with the modified RFSP index to the eNB(s) 203. Alternatively, instead of providing the list of congested NR cells to the eNB, the MME may provide an "NR Congested indicator" or a Tracking Area List (TAI) to which the congested gNB belongs to the eNB. In case the "NR Congested indicator" is provided, the eNB determines the congested gNB based on load information obtained from radio operations and management (OAM) system or directly from connected gNB using the Xn interface. Based on the information about the congested NR cells, the LTE cells or eNBs 203 can prohibit handover to congested NR cells and can also allow handover to un-congested NR cells or gNBs 205. Specifically, the eNB(s) 203 do not initiate the handover of the UE 201 to congested NR cell and also allow the handover of the UE 201 to un-congested NR cells or gNBs 205. The communication of the information about the congested NR cells allows the LTE cells to handover the UE 201 into un-congested NR cells.

When the UE 201 is served by EPC, there is no need to provide updated RFSP Index from 5GC to the EPC.

Without the present technology, when the UE 201 moves from 5G based station or gNB 205 in 5GC network to 4G based station or eNB 203 in 4G network or LTE network, the MME 207 sets the "RFSP Index in use" value the same as the value in the UE context received from AMF 209 via N26 interface if the UE context in AMF also contains a validity period. When the validity period expires, the MME 207 re-evaluates the RFSP Index value. The validity period, i.e., "RFSP in Use Expiry time", is selected by PCF 213 for the UE 201. Without the present technology, the eNBs 203 may not handover the UE 201 into the un-congested gNBs 203.

Figure 3:
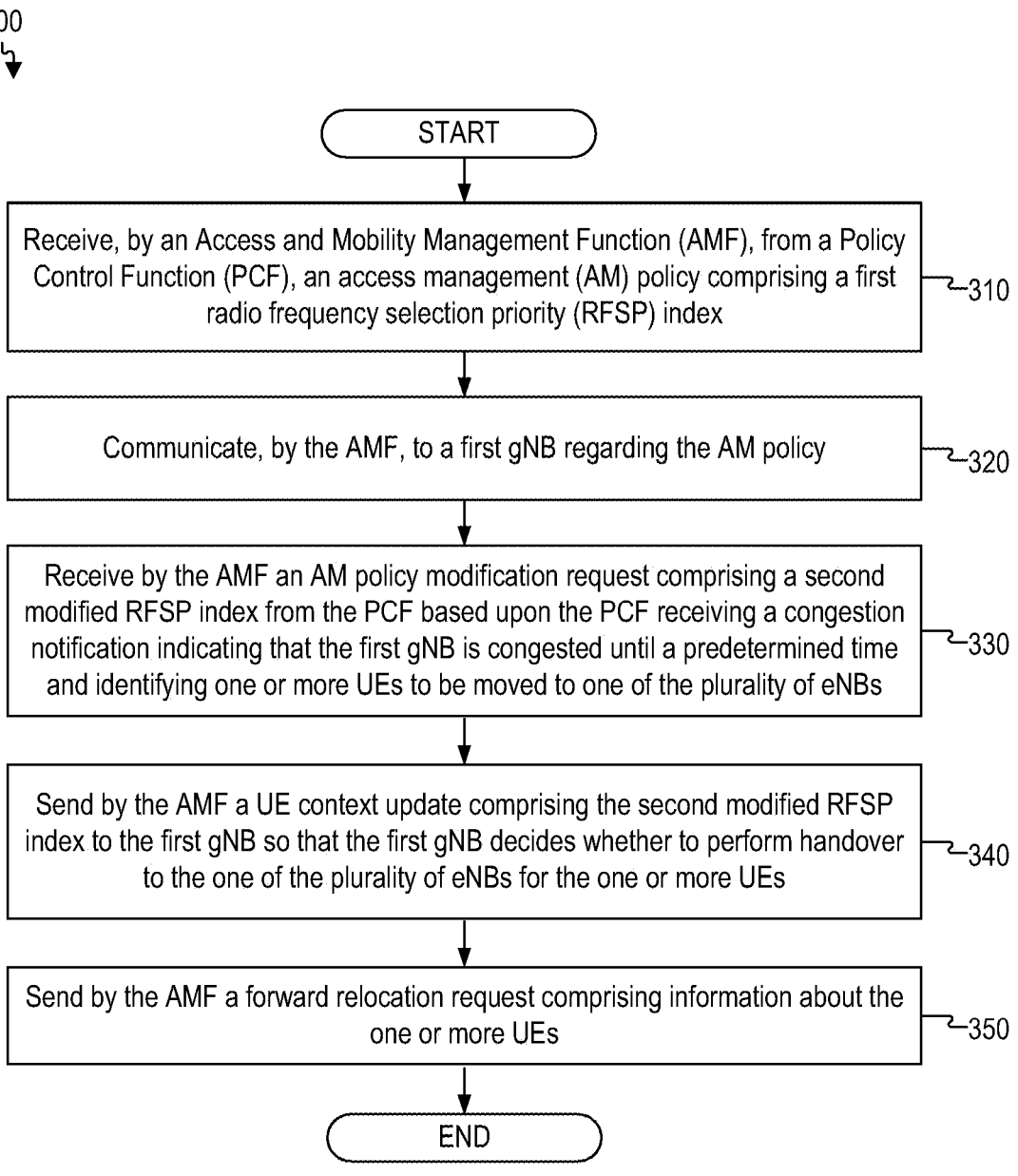
FIG. 3 is an example method for one or more UEs moving between a first network comprising a plurality of gNodeBs (gNBs) and a second network comprising a plurality of evolved NodeBs (eNBs) according to some embodiments of the present technology.

FIG. 3 illustrates an example method 300 for one or more user equipment (UE) moving between a first network including a plurality of gNodeBs (gNBs) and a second network including a plurality of evolved NodeBs (eNBs) according to some embodiments of the present technology. Although the example method 300 depicts a particular sequence of operations, the sequence may be altered without departing from the scope of the present disclosure. For example, some of the operations depicted may be performed in parallel or in a different sequence that does not materially affect the function of method 300. In other examples, different components of an example device or system that implements the method 300 may perform functions at substantially the same time or in a specific sequence.

Figure 4:
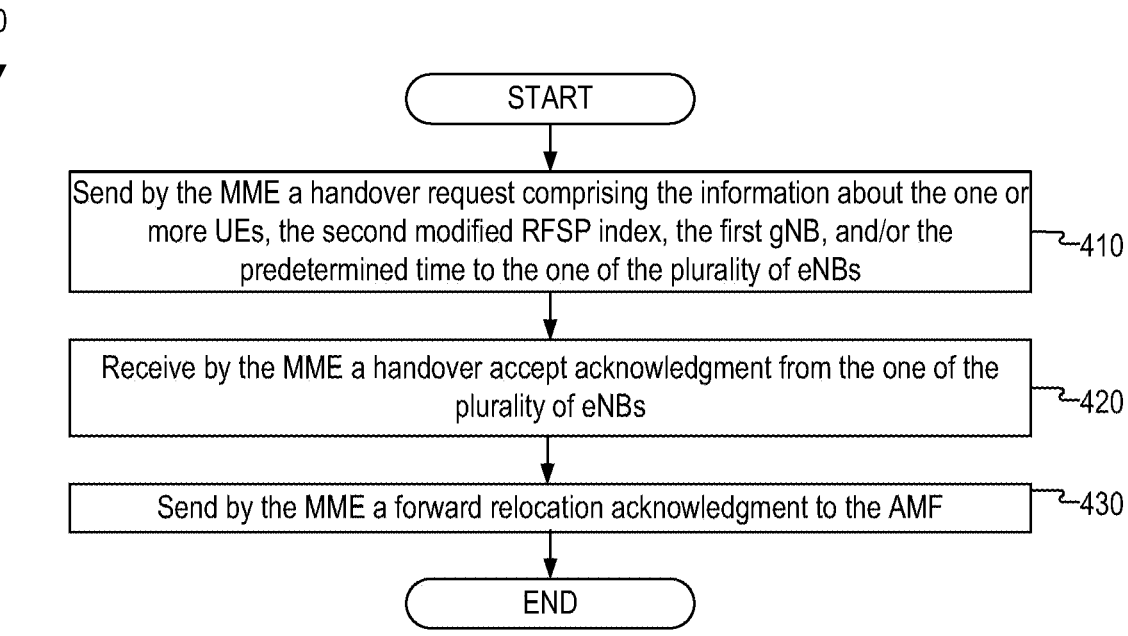
FIG. 4 illustrates an example method according to some embodiments of the present technology.

Method 300 in FIG. 3 will also be discussed in the contexts of FIG. 4, which illustrates additional operations for method 300. Method 300 in FIG. 3 will also be discussed in the context of FIGS. 5A-5B, which illustrate a first part and a second part of an example sequence diagram for mobility management of UEs between 5G and 4G according to some embodiments of the present technology. Operations specific to the present technology illustrated in method 300 are present throughout FIGS. 5A-5B.

According to some examples, method 300 may include receiving an access management (AM) policy including a first radio frequency selection priority (RFSP) index from a PCF at block 310. For example, the AMF 209 illustrated in FIG. 2 may receive an AM policy including a first RFSP index from a PCF 213. In some variations, the AM policy includes information about the first RFSP index.

According to some examples, method 300 may include communicating to a first gNB regarding the AM policy at block 320. For example, the AMF 209 illustrated in FIG. 2 may communicate to a first gNB regarding the AM policy including the first RFSP index.

According to some examples, method 300 may include receiving an AM policy modification request including a second modified RFSP index from the PCF based upon the PCF receiving a congestion notification indicating that the first gNB is congested until a predetermined time and identifying one or more UEs to be moved to one of the plurality of eNBs at block 330. For example, the AMF 209 illustrated in FIG. 2 may receive an AM policy modification request including the second modified RFSP index from the PCF 213 based upon the PCF receiving a congestion notification indicating that the first gNB 205 is congested until a predetermined time and identifying one or more UEs 201 to be moved to one of the plurality of eNBs. In some variations, the AM policy modification request includes information about one or more of the one or more UEs, the second modified RFSP index, and/or congestion of the first gNB until the predetermined time.

According to some examples, method 300 may include sending a UE context update including a second modified RFSP index to the first gNB so that the first gNB decides whether to perform handover to the one of the plurality of eNBs for the one or more UEs at block 340. For example, the AMF 209 illustrated in FIG. 2 may send a UE context update including a second modified RFSP index to the first gNB 205 so that the first gNB decides whether to perform handover to the one of the plurality of eNBs 203 for the one or more UEs 201. In some variations, the UE context update includes information about one or more of the one or more UEs, the second modified RFSP index, and/or the one of the plurality of eNBs.

According to some examples, method 300 may include sending a forward relocation request including information about one or more of the one or more UEs, the second modified RFSP index, the first gNB, and/or the predetermined time to Mobility Management Entity (MME), so that the one of the plurality of eNBs decides whether to handover one of the one or more UEs to a second gNB before the predetermined time at block 350. For example, the AMF 209 illustrated in FIG. 2 may send a forward relocation request including information about one or more of the one or more UEs 201, the second modified RFSP index, the first gNB, and/or the predetermined time to MME 207. The one of the plurality of eNBs decides whether to handover one of the one or more UEs to a second gNB before the predetermined time.

In some variations, the one of the plurality of eNBs is non-congested. The second gNB is not congested until the predetermined time has expired. The one of the plurality of eNBs handovers the first UE to the second gNB before the predetermined time.

In some variations, a first UE moves out of coverage of the first gNB and provides measurements of the second gNB to the one of the plurality of eNBs. The one of the plurality of eNBs handovers a second UE to the second gNB after the predetermined time.

Figure 5A:
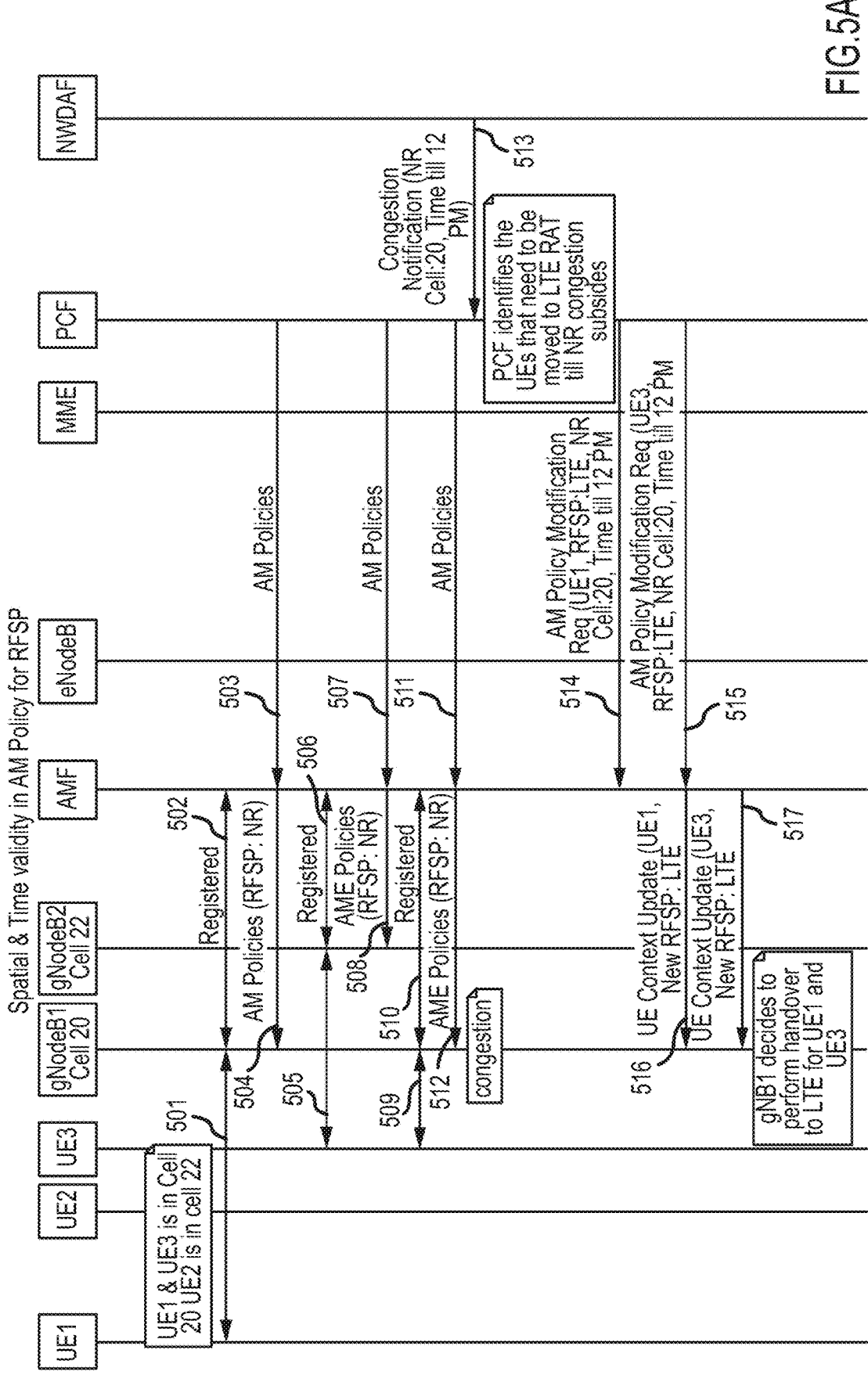
FIG. 5A illustrates an example sequence diagram for mobility management of UEs between 5G and 4G according to some embodiments of the present technology.

Operations 310-350 in method 300 are similar to some operations in FIG. 5A. As shown in FIG. 5A, first UE or UE 1 and third UE or UE3 are in a first gNB cell 20 while second UE or UE2 is in a second gNB or gNB cell 22.

At operation 501 in FIG. 5A, first UE or UE1 is registered with the first gNB such as gNodeB1 cell 20, which is registered with AMF at operation 502. At operation 503, which is the same as block 310 in FIG. 3, AMF receives AM policy from PCF for UE1. The AM policy includes information about the RFSP index for UE1. At operation 504, which is the same as block 320 in FIG. 3, AMF communicates to first gNB or gNB1 cell 20 regarding the AM policy for UE1.

At operation 505 in FIG. 5A, second UE or UE2 is registered with the second gNB such as gNodeB2 cell 22, which is registered with AMF at operation 506. Similar operations for UE1 are repeated for UE2. At operation 507, which is the same as block 310 in FIG. 3, AMF receives AM policy from PCF for UE2. The AM policy includes information about the RFSP index for UE2. At operation 508, which is the same as block 320 in FIG. 3, AMF communicates to second gNB or gNB2 cell 22 regarding the AM policy for UE2.

Similar operations for UE1 are repeated for UE3. At operation 509 in FIG. 5A, third UE or UE3 is registered with the first gNB such as gNodeB1 cell 20, which is registered with AMF at operation 510. At operation 511, which is the same as block 310 in FIG. 3, AMF receives AM policy from PCF for UE3. The AM policy includes information about the RFSP index for UE3. At operation 512, which is the same as block 320 in FIG. 3, AMF communicates to first gNB or gNB1 cell 20 regarding the AM policy for UE3.

At operation 513, PCF receives congestion notification for gNB1 cell 20 from NWDAF. PCF identifies the UEs to be moved to LTE till NR cell congestion subsides.

At operation 514, which is the same as block 330 in FIG. 3, PCF sends an AM policy modification request to AMF for UE1. The AM policy includes information about UE1, RFSP index, LTE congested NR cell or gNB1 (e.g., NR cell 20), time till a pre-determined time, such as 12 pm. NR cell 20 is congested. eNB is not congested.

When the PCF provides the RFSP Index indicating the UE to move to eNB 203 in 4G network, the PCF may also provide the value of "RFSP in Use Expiry time", which is also referred to as "RFSPinUseExpiryTime".

Similar operation for UE1 is repeated for UE3. At operation 515, which is the same as block 330 in FIG. 3, PCF sends an AM policy modification request to AMF for UE3. The AM policy includes information about UE3, RFSP index, LTEgNB1 (e.g., NR cell 20), time till a pre-determined time, such as 12 pm.

At operation 516, which is the same as block 340 in FIG. 3, AMF 209 sends UE context update to gNB1. UE context update is a procedure used by the AMF to update Radio related context (e.g., RFSP index) in the gNB. UE context update is different from UE context, which is the information that is stored about the UE in the AMF. The UE context update includes information about UE1, modified or new RFSP index, LTE. When the AMF selects the RFSP Index in use identical to the modified RFSP Index, the AMF stores the received "RFSPinUseExpiryTime" in UE context.

Similar operation for UE1 is repeated for UE3. At operation 517, which is the same as block 340 in FIG. 3, AMF sends UE context update to gNB1. The UE context includes information about UE3, new RFSP, LTE. Then, gNB1 decides to perform handover to LTE for UE 1 and UE3.

At operation 518, gNB1 sends a handover request to AMF for the UE, such as UE1 or UE3. At operation 519, which is the same as block 350 in FIG. 3, AMF sends a N26 forward relocation request to MME via N26 interface. The forward relocation request includes information about new RFSP, NR cell 20, and "RFSPinUseExpiryTime", such as 12 pm.

When the UE moves from 5G based station or gNB in 5GC network to 4G based station or eNB in 4G network or LTE network, the MME sets the "RFSP Index in use" value the same as the modified RFSP index value in the UE context received from AMF via N26 interface in the forward relocation request. When the validity period expires, the MME re-evaluates the modified RFSP Index value. The validity period, also referred to as "RFSP in Use Expiry time", is selected by the PCF for the UE.

When the mobility of UEs happens between MMEs before the "RFSP in Use Expiry time" expires, the remaining value of the "RFSP in Use Expiry time" is sent to another MME, which may handle the RFSP Index in the same way as for the mobility of the UEs from the AMF to the MME as described above.

FIG. 4 illustrates the example method 400 according to some embodiments of the present technology. According to some examples, method 400 may also include sending a handover request including the information about one or more of the one or more UEs, the second modified RFSP index, the first gNB 205, and/or the predetermined time to the one of the plurality of eNBs 203 at block 410. For example, the MME 207 illustrated in FIG. 2 may send a handover request including the information about the one or more UEs 201, the second modified RFSP index, the first gNB 205, and/or the predetermined time to the one of the plurality of eNBs 203. Alternatively, instead of providing the list of congested NR cells to the eNB, the MME may provide an "NR Congested indicator" or a Tracking Area List (TAI) to which the congested gNB belongs to the eNB. In case the "NR Congested indicator" is provided, the eNB determines the congested gNB based on load information obtained from radio operations and management (OAM) system or directly from connected gNB using the Xn interface.

According to some examples, method 400 may also include receiving a handover accept acknowledgment from the one of the plurality of eNBs at block 420. For example, the MME 207 illustrated in FIG. 2 may receive a handover accept acknowledgment from the one of the plurality of eNBs 203.

According to some examples, method 400 may also include sending a forward relocation acknowledgment to the AMF at block 430. For example, the MME 207 illustrated in FIG. 2 may send a forward relocation complete to the AMF 209.

Figure 5B:
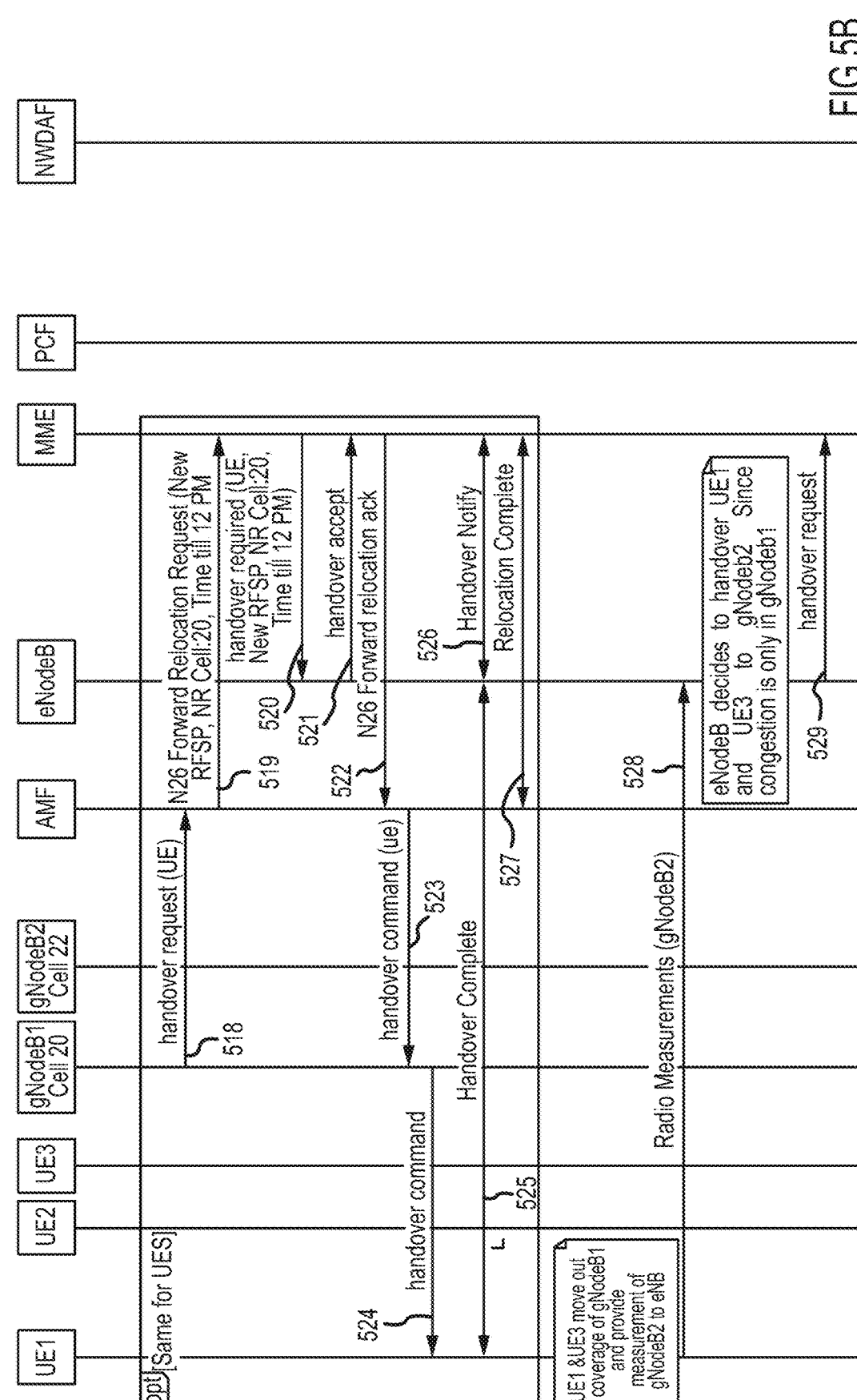
FIG. 5B illustrates a continuation of the example sequence diagram for mobility management of UEs between 5G and 4G of FIG. 5A according to some embodiments of the present technology.

Blocks 410-430 of method 400 in FIG. 4 are similar to some operations of FIG. 5B. Operations 518-524 in FIG. 5B are similar for UE1 and UE3 and are described as follows. At operation 520 in FIG. 5B, which is the same operation as block 410 in FIG. 4, MME sends handover request to eNB. The handover request includes information about UE, new RFSP, NR cell 20, time till a predetermined time, such as 12 pm. Alternatively, instead of providing the list of congested NR cells to the eNB, the MME may provide an "NR Congested indicator" or a Tracking Area List (TAI) to which the congested gNB belongs to the eNB. In case the "NR Congested indicator" is provided, the eNB determines the congested gNB based on load information obtained from radio operations and management (OAM) system or directly from connected gNB using the Xn interface. At operation 521 in FIG. 5B, which is the same operation as block 420 in FIG. 4, eNB sends handover accept acknowledgement to MME. At operation 522 in FIG. 5B, which is the same operation as block 430 in FIG. 4, MME sends N26 forward relocation complete to AMF via N26 interface.

FIG. 5B also illustrates additional operations 523-528 for handover of UE1 from congested NR cell 20 or gNB1 to uncongested eNB. At operation 523, AMF sends handover command to gNB1 or NR cell 20. At operation 524, gNB1 or cell 20 sends handover command to UE1 (or UE3). At operation 525, handover of UE1 to eNB is complete. At operation 526, eNB and MME exchanges handover notification for UE1. At operation 527, the MME and the AMF exchange Relocation complete, for example, handover of UE1 to eNB is complete. Similar operation occurs for UE3. UE1 now moves out of coverage of gNB1 and provides measurement of gNB2 to uncongested eNB.

FIG. 5B also illustrates additional operation 528-529 for handover of UE1 from eNB to uncongested NR cell 22 or gNB2. At operation 528, UE1 provides radio measurements for gNB2 or cell 22 to eNB. At operation 529, eNB sends handover request to MME.

Figure 5C:
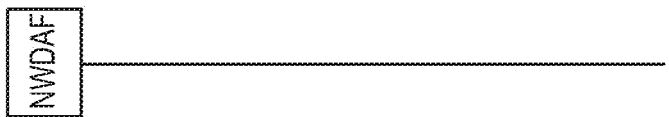
FIG. 5C illustrates a continuation of the example sequence diagram for mobility management of UEs between 5G and 4G of FIG. 5B according to some embodiments of the present technology.
Figure 5C:
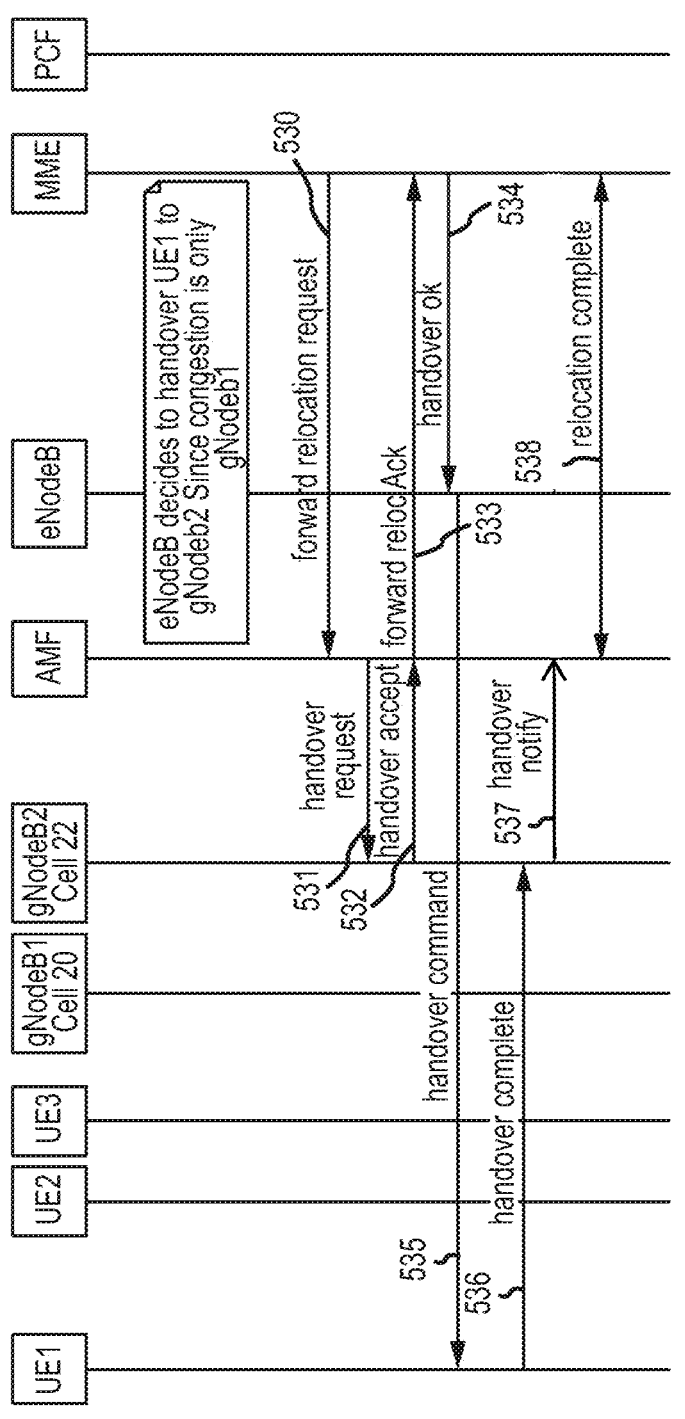

FIG. 5C illustrates additional operations 530-538. At operation 530, eNB decides to handover UE1 to gNB2 since gNB1 is still congested. MME sends forward relocation handover request to AMF. At operation 531, AMF sends handover request to gNB2. At operation 532, gNB2 sends handover accept notice to AMF. At operation 533, AMF sends forward relocation complete to MME.

At operation 534, the MME sends handover accepted command to eNB. At operation 535, eNB sends handover command to UE1. At operation 536, UE1 sends handover complete to gNB2. At operation 537, gNB2 sends handover notification to the AMF. At operation 538, relocation complete exchanges between AMF and MME.

Figure 6A:
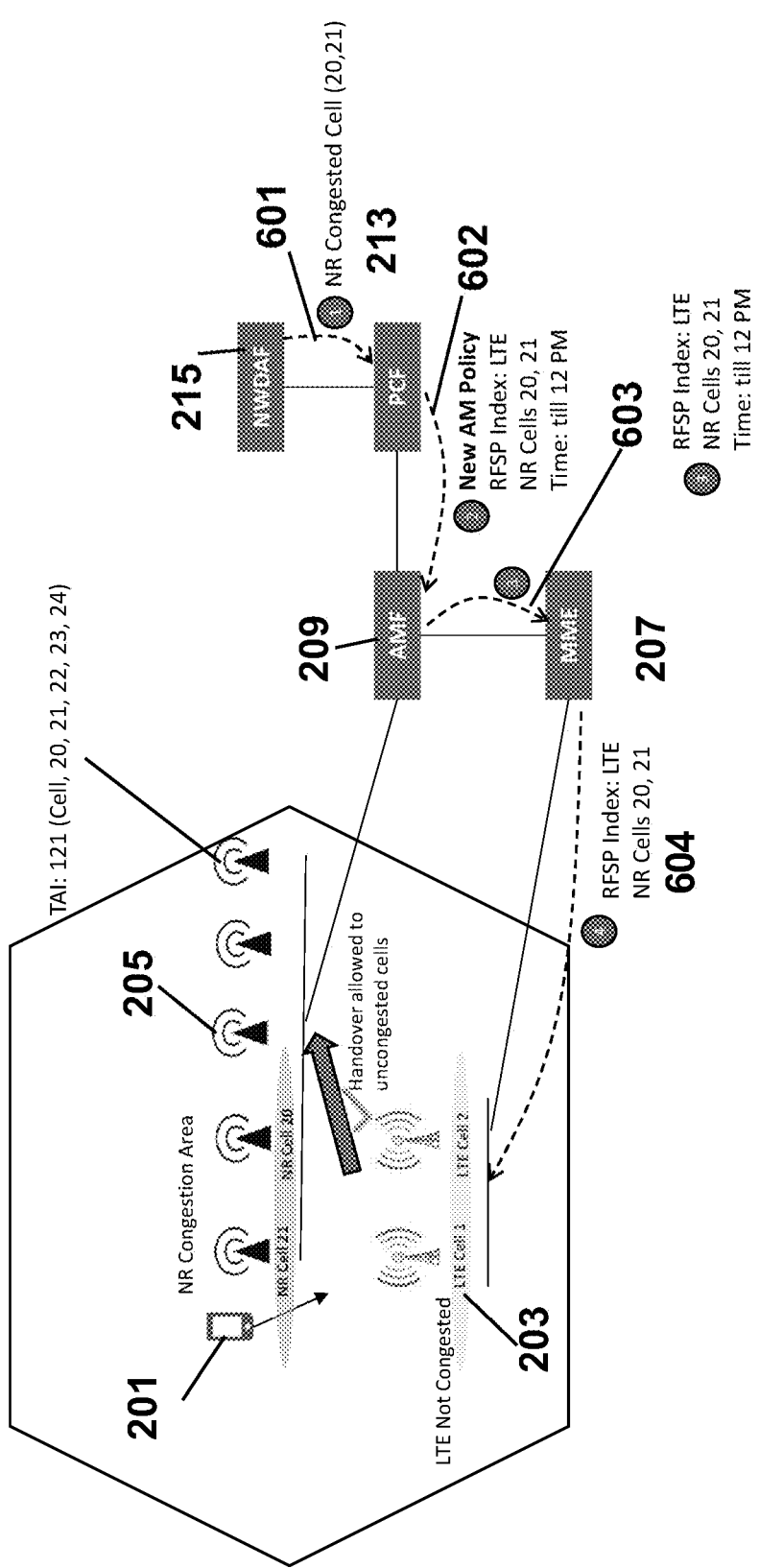
FIG. 6A is an example network diagram illustrating features of mobility management of identified UE between new radio (NR) cells and Long-Term Evolution (LTE) cells with a modified AM policy according to some embodiments of the present technology.

FIG. 6A is an example network diagram illustrating features of mobility management of identified UE between NR cells and LTE cells with a modified AM policy according to some embodiments of the present technology. As illustrated in FIG. 6, a first region including a first subset of NR cells is congested, such as NR cell 20, NR cell 21 and a second region including a second subset of NR cells is not congested, such as NR cells 22-24. LTE cell 1 and LTE cell 2 are not congested. Handover from LTE cell 1 or 2 to any one of uncongested NR cells 22-24 is allowed by using the present technology, for example, methods 300 and 400 in FIGS. 3-4, respectively, and the sequence diagram in 5A-5B.

The network diagram includes a simplified workflow including operations 601-604. The simplified workflow includes PCF 213 receiving notification about NR congested cells 20-21 from NWDAF 215 at 601. The simplified workflow also includes PCF sending modified (or new) AM policy to AMF at 602. The modified AM policy includes modified RFSP index, information about LTE, NR cells 20, 21, and time till 12 pm. The simplified workflow also includes AMF sending the modified RFSP index, information about LTE, NR cells 20, 21, time till 12 pm to MME 207 at 603. The simplified workflow also includes MME sending the modified RFSP index, LTE, NR cells 20, 21 to LTE cell 1 or 2 at 604. The communication of the information about the congested NR cells 20, 21 allows the LTE cells to handover the UEs into un-congested NR cells 22-24.

Figure 6B:
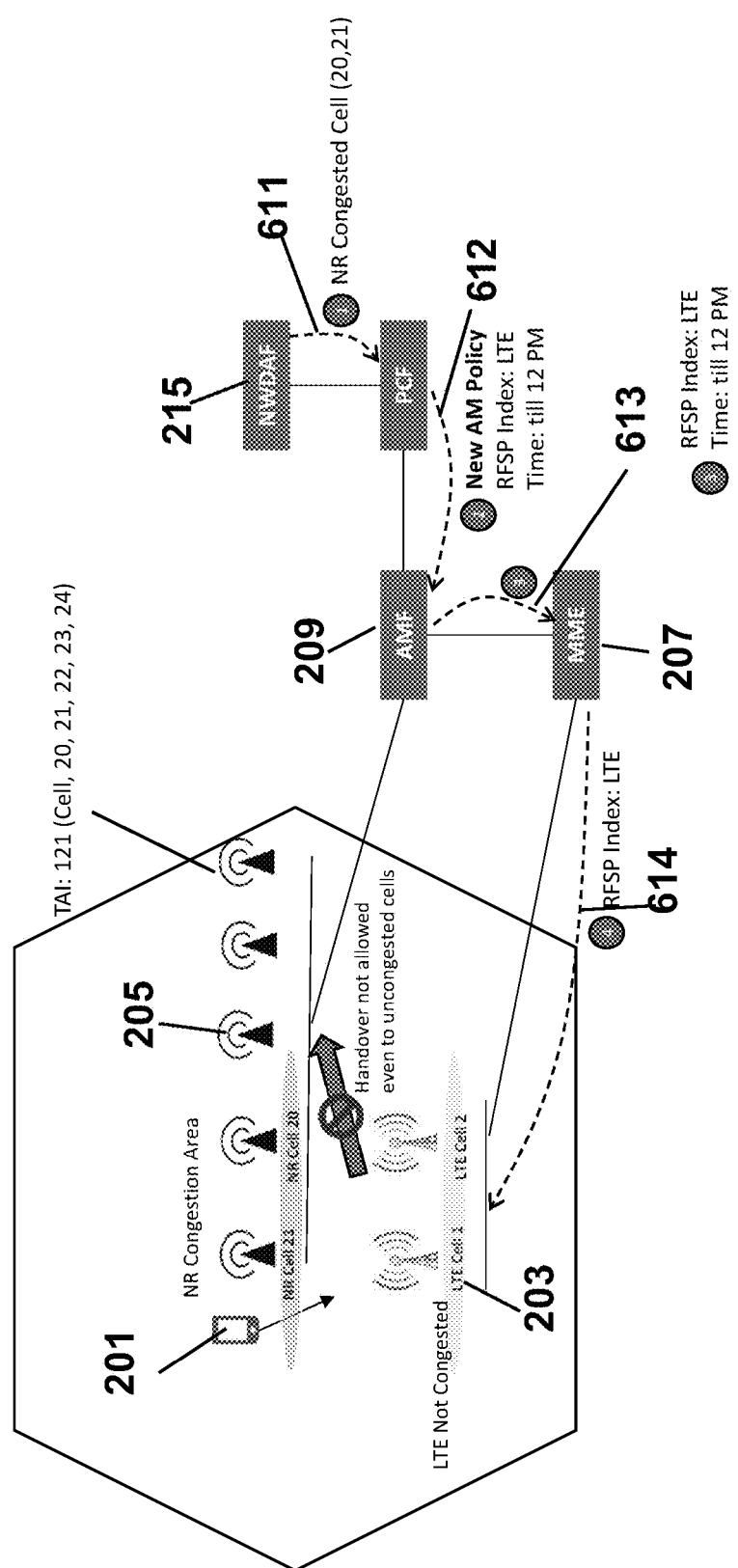
FIG. 6B illustrates an example network diagram without a modified AM policy as a comparison to the diagram of FIG. 6A.
Figure 7:
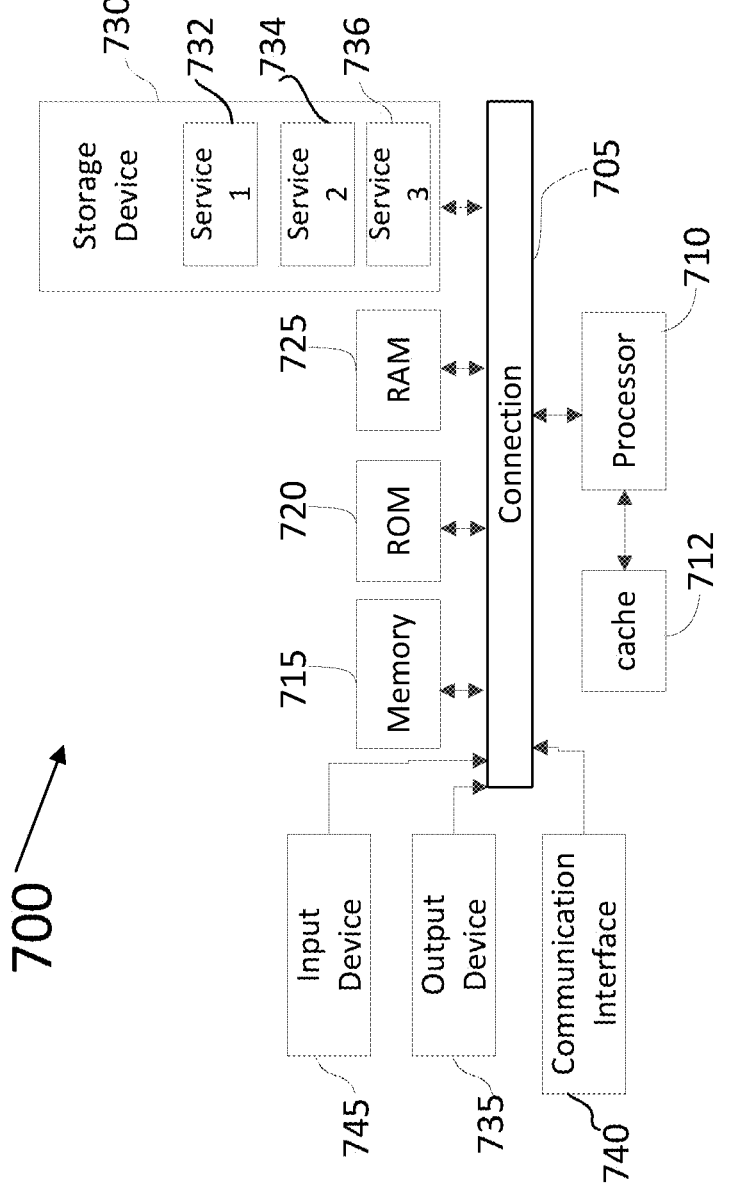
FIG. 7 shows an example computing system for implementing certain aspects of the present technology.

FIG. 6B illustrates an example network diagram without a modified AM policy as a comparison to the diagram of FIG. 6A. As shown in FIG. 6B, the handover from LTE cell 1 and/or LTE cell 2 to any one of un-congested NR cells 22-24 is not allowed. The workflow is different from that shown in FIG. 6A. At 611, PCF receives notification about congested NR cells 20, 21. At 612, PCF sends an AM policy to AMF However, the AM policy does not include information about congested NR cells 20, 21. At 613, AMF sends the RFSP index, information about LTE, time till 12 pm to MME 207. However, no information about the congested NR cells 20, 21 is communicated between AMF and MME. At 614, MME sending the RFSP index, information about LTE to LTE cell 1 or 2. However, no information about the congested NR cells 20,21 is communicated between MME 207 and LTE cell 1 or 2.

FIG. 7 shows an example of computing system 700, which can be for example any computing device making up any of the entities illustrated in FIG. 2, such as AMF, MME, PCF, eNB, gNB, or any component thereof in which the components of the system are in communication with each other using connection 705. Connection 705 can be a physical connection via a bus, or a direct connection into processor 710, such as in a chipset architecture. Connection 705 can also be a virtual, networked connection, or logical connection.

In some embodiments, computing system 700 is a distributed system in which the functions described in this disclosure can be distributed within a data center, multiple data centers, a peer network, etc. In some embodiments, one or more of the described system components represents many such components each performing some or all of the function for which the component is described. In some embodiments, the components can be physical or virtual devices.

Computing system 700 includes at least one processing unit (CPU or processor) 710 and connection 705 that couples various system components including system memory 715, such as read-only memory (ROM) 720 and random-access memory (RAM) 725 to processor 710. Computing system 700 can include a cache of high-speed memory 712 connected directly with, close to, or integrated as part of processor 710.

Processor 710 can include any general-purpose processor and a hardware service or software service, such as services 732, 734, and 736 stored in storage device 730, configured to control processor 710 as well as a special-purpose processor where software instructions are incorporated into the actual processor design. Processor 710 may essentially be a completely self-contained computing system, containing multiple cores or processors, a bus, a memory controller, a cache, etc. A multi-core processor may be symmetric or asymmetric.

To enable user interaction, computing system 700 includes an input device 745, which can represent any number of input mechanisms, such as a microphone for speech, a touch-sensitive screen for gesture or graphical input, a keyboard, mouse, motion input, speech, etc. Computing system 700 can also include output device 735, which can be one or more of the output mechanisms known to those of skill in the art. In some instances, multimodal systems can enable a user to provide multiple types of input/output to communicate with computing system 700. Computing system 700 can include a communication interface 740, which can generally govern and manage the user input and system output. There is no restriction on operating on any particular hardware arrangement, and therefore the basic features here may easily be substituted for improved hardware or firmware arrangements as they are developed.

Storage device 730 can be a non-volatile memory device and can be a hard disk or other types of computer-readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 730 can include software services, servers, services, etc., and when the code that defines such software is executed by the processor 710, it causes the system to perform a function. In some embodiments, a hardware service that performs a particular function can include the software component stored in a computer-readable medium in connection with the necessary hardware components, such as processor 710, connection 705, output device 735, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in the memory of a client device and/or one or more servers of a content management system and perform one or more functions when a processor executes the software associated with the service. In some embodiments, a service is a program or a collection of programs that carry out a specific function. In some embodiments, a service can be considered a server. Memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general-purpose computer, special-purpose computer, or special-purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware, and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Aspect 1. A method for one or more user equipment (UE) moving between a first network comprising a plurality of gNodeBs (gNBs) and a second network comprising a plurality of evolved NodeBs (eNBs), the method comprising: receiving, by an Access and Mobility Management Function (AMF), from a Policy Control Function (PCF), an access management (AM) policy comprising a first radio frequency selection priority (RFSP) index; communicating, by the AMF, to a first gNB regarding the AM policy; receiving, by the AMF, an AM policy modification request comprising a second modified RFSP index from the PCF, based upon the PCF receiving a congestion notification indicating that the first gNB is congested until a predetermined time and identifying one or more UEs to be moved to one of the plurality of eNBs; sending, by the AMF, a UE context update comprising the second modified RFSP index to the first gNB so that the first gNB decides whether to perform handover to the one of the plurality of eNBs for the one or more UEs; and sending, by the AMF, a forward relocation request comprising information about one or more of the one or more UEs, the second modified RFSP index, the first gNB, and/or the predetermined time to Mobility Management Entity (MME), so that the one of the plurality of eNBs decides whether to handover one of the one or more UEs to a second gNB before the predetermined time.

Aspect 2. The method of Aspect 1, further comprising: sending, by the MME, a handover request comprising the information about one or more of the one or more UEs, the second modified RFSP index, one of the first gNB, a New Radio (NR) congested indicator, or a Tracking Area List (TAI) of congested gNB, and/or the predetermined time to the one of the plurality of eNBs; receiving, by the MME, a handover accept acknowledgment from the one of the plurality of eNBs; and sending, by the MME, a forward relocation acknowledgment to the AMF.

Aspect 3. The method of any of Aspects 1 to 2, wherein the second gNB is not congested until the predetermined time has expired.

Aspect 4. The method of any of Aspects 1 to 3, wherein a first UE moves out of coverage of the first gNB and provides measurements of the second gNB to the one of the plurality of eNBs.

Aspect 5. The method of any of Aspects 1 to 4, wherein the one of the plurality of eNBs handovers the first UE to the second gNB before the predetermined time.

Aspect 6. The method of any of Aspects 1 to 5, wherein the one of the plurality of eNBs handovers a second UE to the second gNB after the predetermined time.

Aspect 7. The method of any of Aspects 1 to 6, wherein the one of the plurality of eNBs is non-congested.

Aspect 8. The method of any of Aspects 1 to 7, wherein the AM policy comprises information about the first RFSP index.

Aspect 9. The method of any of Aspects 1 to 8, wherein the AM policy modification request comprises information about one or more of the one or more UEs, the second modified RFSP index, and/or congestion of the first gNB until the predetermined time.

Aspect 10. The method of any of Aspects 1 to 9, wherein the UE context update comprises information about one or more of the one or more UEs, the second modified RFSP index, and/or the one of the plurality of eNBs.

Aspect 11. A computer-readable medium comprising instructions using a computer system. The instructions, when executed by a computing system, cause the computing system to receive, by an Access and Mobility Management Function (AMF), from a Policy Control Function (PCF), an access management (AM) policy comprising a first radio frequency selection priority (RFSP) index; communicate, by the AMF, to a first gNB regarding the AM policy; receive, by the AMF, an AM policy modification request comprising a second modified RFSP index from the PCF, based upon the PCF receiving a congestion notification indicating that the first gNB is congested until a predetermined time and identify one or more UEs to be moved to one of the plurality of eNBs; send, by the AMF, a UE context update comprising the second modified RFSP index to the first gNB so that the first gNB decides whether to perform handover to the one of the plurality of eNBs for the one or more UEs; and send, by the AMF, a forward relocation request comprising information about one or more of the one or more UEs, the second modified RFSP index, the first gNB, and/or the predetermined time to Mobility Management Entity (MME), so that the one of the plurality of eNBs decides whether to handover one of the one or more UEs to a second gNB before the predetermined time.

Aspect 12. The computer-readable medium of Aspect 11, wherein the instructions, when executed by a computing system, cause the computing system to send, by the MME, a handover request comprising the information about one or more of the one or more UEs, the second modified RFSP index, one of the first gNB, a New Radio (NR) congested indicator, or a Tracking Area List (TAI) of congested gNB, and/or the predetermined time to the one of the plurality of eNBs. The instructions, when executed by a computing system, cause the computing system to receive, by the MME, a handover accept acknowledgment from the one of the plurality of eNBs. The instructions, when executed by a computing system, cause the computing system to send, by the MME, a forward relocation acknowledgment to the AMF.

Aspect 13. The computer-readable medium of any of Aspects 11 to 12, wherein the second gNB is not congested until the predetermined time has expired.

Aspect 14. The computer-readable medium of any of Aspects 11 to 13, wherein a first UE moves out of coverage of the first gNB and provides measurements of the second gNB to the one of the plurality of eNBs.

Aspect 15. The computer-readable medium of any of Aspects 11 to 14, wherein the one of the plurality of eNBs handovers the first UE to the second gNB before the predetermined time.

Aspect 16. The computer-readable medium of any of Aspects 11 to 15, wherein the one of the plurality of eNBs handovers a second UE to the second gNB after the predetermined time.

Aspect 17. The computer-readable medium of any of Aspects 11 to 16, wherein the one of the plurality of eNBs is non-congested, wherein the AM policy comprises information about the first RFSP index.

Aspect 18. The computer-readable medium of any of Aspects 11 to 17, wherein the AM policy modification request comprises information about one or more of the one or more UEs, the second modified RFSP index, and/or congestion of the first gNB until the predetermined time.

Aspect 19. The computer-readable medium of any of Aspects 11 to 18, wherein the UE context update comprises information about one or more of the one or more UEs, and the second modified RFSP index.

Aspect 20. A network system comprising an Access and Mobility Management Function (AMF); a policy control function (PCF); a Mobility Management Entity (MME); an interface between the AMF and the MME; and one or more processors coupled to the AMF, PCF, MME, and interface, the one or more processors configured to execute instructions to cause the one or more processors to: receive, by the AMF, from the PCF, an access management (AM) policy comprising a first radio frequency selection priority (RFSP) index; communicate, by the AMF, to a first gNB regarding the AM policy; receive, by the AMF, an AM policy modification request comprising a second modified RFSP index from the PCF, based upon the PCF receiving a congestion notification indicating that the first gNB is congested until a predetermined time and identifying one or more UEs to be moved to one of the plurality of eNBs; send, by the AMF, a UE context update comprising the second modified RFSP index to the first gNB so that the first gNB decides whether to perform handover to the one of the plurality of eNBs for the one or more UEs; and send, by the AMF, a forward relocation request comprising information about one or more of the one or more UEs, the second modified RFSP index, the first gNB, and/or the predetermined time to the MME, so that the one of the plurality of eNBs decides whether to handover one of the one or more UEs to a second gNB before the predetermined time.

What is claimed is:

1. A method for one or more user equipment (UE) moving between a first network comprising a plurality of gNodeBs (gNBs) and a second network comprising a plurality of evolved NodeBs (eNBs), the method comprising:

receiving, by an Access and Mobility Management Function (AMF), from a Policy Control Function (PCF), an access management (AM) policy comprising a first radio frequency selection priority (RFSP) index;

communicating, by the AMF, to a first gNB regarding the AM policy;

receiving, by the AMF, an AM policy modification request comprising a second modified RFSP index from the PCF, based upon the PCF receiving a congestion notification indicating that the first gNB is congested until a predetermined time and identifying one or more UEs to be moved to one of the plurality of eNBs;

sending, by the AMF, a UE context update comprising the second modified RFSP index to the first gNB so that the first gNB decides whether to perform handover to the one of the plurality of eNBs for the one or more UEs; and sending, by the AMF, a forward relocation request comprising information about one or more of the one or more UEs, the second modified RFSP index, the first gNB, and/or the predetermined time to Mobility Management Entity (MME), so that the one of the plurality of eNBs decides whether to handover one of the one or more UEs to a second gNB before the predetermined time.

2. The method of claim 1, further comprising:

sending, by the MME, a handover request comprising the information about one or more of the one or more UEs, the second modified RFSP index, the first gNB, and/or the predetermined time to the one of the plurality of eNBs;

receiving, by the MME, a handover accept acknowledgment from the one of the plurality of eNBs; and sending, by the MME, a forward relocation acknowledgment to the AMF.

3. The method of claim 2, wherein the second gNB is not congested until the predetermined time has expired.

4. The method of claim 3, wherein a first UE moves out of coverage of the first gNB and provides measurements of the second gNB to the one of the plurality of eNBs.

5. The method of claim 4, wherein the one of the plurality of eNBs handovers the first UE to the second gNB before the predetermined time.

6. The method of claim 1, wherein the one of the plurality of eNBs is non-congested.

7. The method of claim 1, wherein the AM policy comprises information about the first RESP index and the first gNB.

8. The method of claim 7, wherein the AM policy modification request comprises information about one or more of the one or more UEs, the second modified RFSP index, and/or congestion of the first gNB until the predetermined time.

9. The method of claim 8, wherein the UE context update comprises information about one or more of the one or more UEs, and the second modified RFSP index.

10. A non-transitory computer-readable medium comprising instructions, the instructions, when executed by a computing system, cause the computing system to:

receive, by an Access and Mobility Management Function (AMF), from a Policy Control Function (PCF), an access management (AM) policy comprising a first radio frequency selection priority (RFSP) index;

communicate, by the AMF, to a first gNB regarding the AM policy;

receive, by the AMF, an AM policy modification request comprising a second modified RFSP index from the PCF, based upon the PCF receiving a congestion notification indicating that the first gNB is congested until a predetermined time and identifying one or more UEs to be moved to one of the plurality of eNBs;

send, by the AMF, a UE context update comprising the second modified RFSP index to the first gNB so that the first gNB decides whether to perform handover to the one of the plurality of eNBs for the one or more UEs; and send, by the AMF, a forward relocation request comprising information about one or more of the one or more UEs, the second modified RFSP index, the first gNB, and/or the predetermined time to Mobility Management Entity (MME), so that the one of the plurality of eNBs decides whether to handover one of the one or more UEs to a second gNB before the predetermined time.

11. The computer-readable medium of claim 10, wherein the instructions, when executed by a computing system, cause the computing system to:

send, by the MME, a handover request comprising the information about one or more of the one or more UEs, the second modified RFSP index, the first gNB, and/or the predetermined time to the one of the plurality of eNBs;

receive, by the MME, a handover accept acknowledgment from the one of the plurality of eNBs; and send, by the MME, a forward relocation acknowledgment to the AMF.

12. The computer-readable medium of claim 11, wherein the second gNB is not congested until the predetermined time has expired.

13. The computer-readable medium of claim 12, wherein a first UE moves out of coverage of the first gNB and provides measurements of the second gNB to the one of the plurality of eNBs.

14. The computer-readable medium of claim 13, wherein the one of the plurality of eNBs handovers the first UE to the second gNB before the predetermined time.

15. The computer-readable medium of claim 10, wherein the AM policy comprises information about the first RESP index and the first gNB.

16. The computer-readable medium of claim 15, wherein the AM policy modification request comprises information about one or more of the one or more UEs, the second modified RFSP index, and/or congestion of the first gNB until the predetermined time.

17. The computer-readable medium of claim 16, wherein the UE context update comprises information about one or more of the one or more UEs, and the second modified RFSP index.

18. A network system comprising:

an Access and Mobility Management Function (AMF);

a policy control function (PCF);

a Mobility Management Entity (MME);

an interface between the AMF and the MME; and one or more processors coupled to the AMF, PCF, MME, and interface, the one or more processors configured to:

receive, by the AMF, from the PCF, an access management (AM) policy comprising a first radio frequency selection priority (RFSP) index;

communicate, by the AMF, to a first gNB regarding the AM policy;

receive, by the AMF, an AM policy modification request comprising a second modified RFSP index from the PCF, based upon the PCF receiving a congestion notification indicating that the first gNB is congested until a predetermined time and identifying one or more UEs to be moved to one of the plurality of eNBs;

send, by the AMF, a UE context update comprising the second modified RFSP index to the first gNB so that the first gNB decides whether to perform handover to the one of the plurality of eNBs for the one or more UEs; and send, by the AMF, a forward relocation request comprising information about one or more of the one or more UEs, the second modified RFSP index, the first gNB, and/or the predetermined time to the MME, so that the one of the plurality of eNBs decides whether to handover one of the one or more UEs to a second gNB before the predetermined time.

19. The network system of claim 18, wherein the one or more processors are configured to:

send, by the MME, a handover request comprising the information about one or more of the one or more UEs, the second modified RFSP index, the first gNB, and/or the predetermined time to the one of the plurality of eNBs;

receive, by the MME, a handover accept acknowledgment from the one of the plurality of eNBs; and send, by the MME, a forward relocation acknowledgment to the AMF.

20. The network system of claim 18, wherein the second gNB is not congested until the predetermined time has expired.

* * * * *